United States Patent
Taratorin et al.

(10) Patent No.: US 9,548,083 B2
(45) Date of Patent: Jan. 17, 2017

(54) READ SENSOR TESTING USING THERMAL MAGNETIC FLUCTUATION NOISE SPECTRA

(75) Inventors: Alexander M. Taratorin, Sunnyvale, CA (US); Henry Patland, Los Gatos, CA (US); Wade A. Ogle, San Jose, CA (US)

(73) Assignee: Infinitum Solutions, Inc., Santa Clara, CA (US)

(*) Notice: Subject to any disclaimer, the term of this patent is extended or adjusted under 35 U.S.C. 154(b) by 2168 days.

(21) Appl. No.: 11/953,856

(22) Filed: Dec. 10, 2007

(65) Prior Publication Data
US 2009/0147389 A1  Jun. 11, 2009

(51) Int. Cl.
*G11B 5/455*  (2006.01)
*G11B 27/36*  (2006.01)
*G11B 5/31*   (2006.01)

(52) U.S. Cl.
CPC ............ *G11B 27/36* (2013.01); *G11B 5/3166* (2013.01); *G11B 5/3169* (2013.01); *G11B 5/455* (2013.01); *G11B 2220/2516* (2013.01)

(58) Field of Classification Search
CPC .......... G01B 5/455; H01L 43/06; H01L 43/08; H01L 43/00; G01R 33/12; G01R 33/1215; G01R 33/1253; G01R 33/14; G01R 33/123; G01R 33/077; G01R 33/09; G01R 33/091; G01R 33/093; G01R 33/095; G01R 33/096; G01R 33/098; G01R 33/06; G01R 33/07; G01R 33/072; G11B 5/455; G11B 5/4555; G11B 2005/0016; G11B 5/3166

USPC .......................................................... 324/210
See application file for complete search history.

(56) References Cited

U.S. PATENT DOCUMENTS

| | | |
|---|---|---|
| 5,991,698 A | 11/1999 | Hao et al. |
| 6,532,646 B2 | 3/2003 | Watanuki |
| 7,014,530 B2 | 3/2006 | Kasiraj et al. |
| 7,147,539 B1 | 12/2006 | Hao et al. |
| 7,206,172 B2 | 4/2007 | Ding et al. |
| 7,550,967 B1 * | 6/2009 | Patland et al. ................ 324/210 |

OTHER PUBLICATIONS

Thermal Magnetic Noise in Tunneling Readers, Heinonen et al. IEEE Transactions on Magnetics, vol. 40, No. 4, Jul. 2004, 6 pages.*

(Continued)

*Primary Examiner* — David M. Schindler
(74) *Attorney, Agent, or Firm* — Silicon Valley Patent Group LLP

(57) ABSTRACT

A read head is tested by measuring the thermal magnetic fluctuation noise spectrum. A non-uniformity in the magnetic field of the free layer is produced and the thermal magnetic fluctuation noise spectrum is measured, with and/or without an external magnetic field applied. A peak in the thermal magnetic fluctuation noise spectrum can be used to derive the desired dimension of the free layer, such as track width and stripe height. The resulting measurement may then be fed back into the process control for the production of the read heads if desired. Additionally, the stiffness of the free layer and the strength of the reference layer may be determined using ferromagnetic resonance peaks in the thermal magnetic fluctuation noise spectrum.

15 Claims, 14 Drawing Sheets

(56) References Cited

OTHER PUBLICATIONS

Klaassen et al., "Broad-Band Noise Spectroscopy of Giant Magnetoresistive Read Heads", *IEEE Transactions on Magnetics*, vol. 41, No. 7, Jul. 2005, pp. 2307-2317.
van Peppen et al., "A New Approach to Micromagnetic Simulation of Thermal Magnetic Fluctuation Noise in Magnetoresistive Read Sensors", *IEEE Transactions on Magnetics*, vol. 42, No. 1, Jan. 2006, pp. 56-69.
Nazarov et al., "Microwave generation in MgO magnetic tunnel junctions due to spin transfer effects (invited)", *Journal of Applied Physics 103*, 07A503 (2008), Presented Nov. 9, 2007, received Sep. 7, 2007, accepted Nov. 7, 2007, published Feb. 12, 2008, 6 pgs.
Zhou, "Thermally excited magnetic noise from pinned and reference layers in current perpendicular-to-plane structure magnetoresistive heads", *Journal of Applied Physics 103*, 07F516 (2008), Presented Nov. 8, 2007, received Sep. 12, 2007, accepted Oct. 25, 2007, published Feb. 5, 2008, 3 pgs.
Han et al., "Abnormal increase in ferromagnetic resonance amplitude just before the breakdown in tunnel magnetoresistive heads", *Journal of Applied Physics 103*, 07F518 (2008), Presented Nov. 8, 2007, received Sep. 10, 2007, accepted Oct. 31, 2007, published Feb. 6, 2008, 3 pgs.
Zhou, "Thermally excited low frequency magnetic noise in CPP Structure MR Heads", *IEEE Transactions on Magnetics*, vol. 43, No. 6, Jun. 2007, pp. 2187-2192.
McFadyen, I.R., et al., "State-of-the-Art Magnetic Hard Disk Drives," MRS Bulletin, May 2006, vol. 31, pp, 379-383.

\* cited by examiner

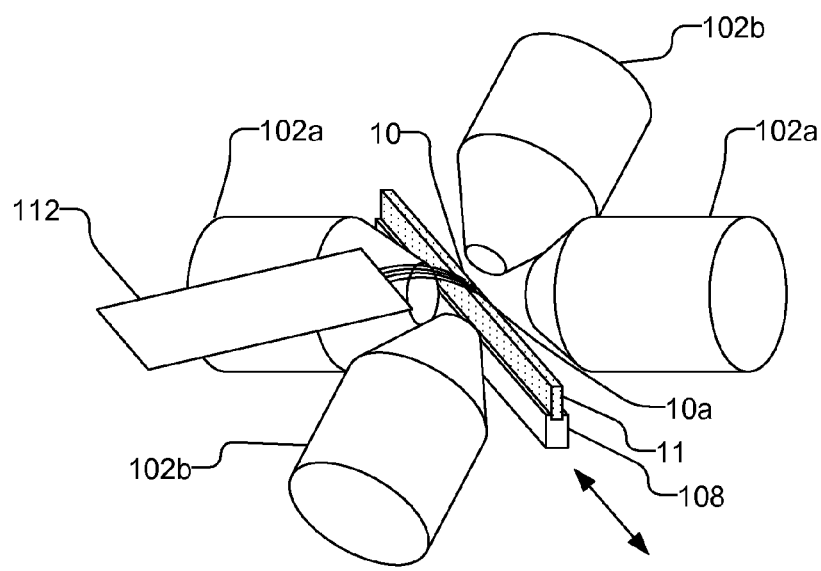
Fig. 10A
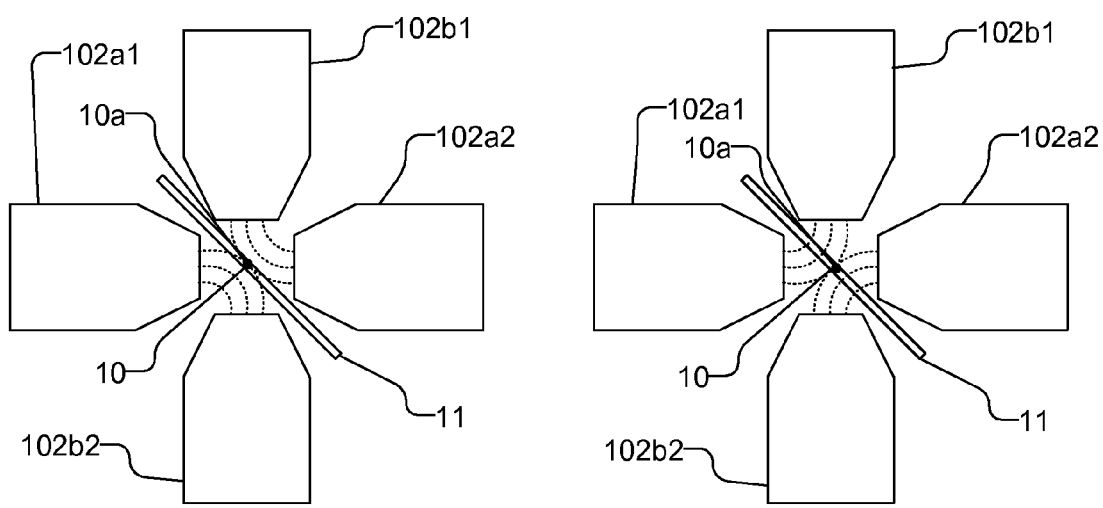
Fig. 10B
Fig. 10C

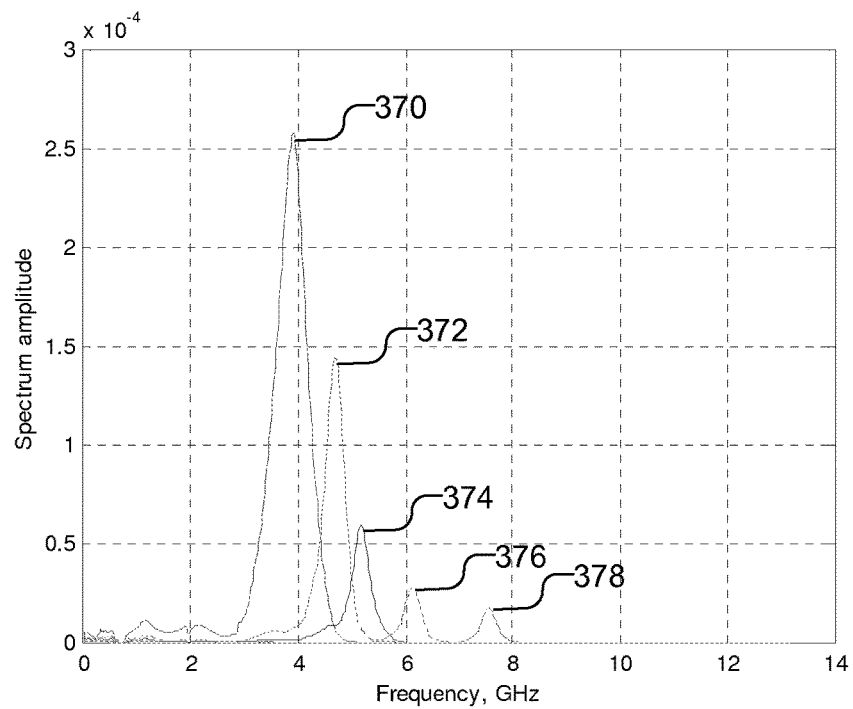
Fig. 15
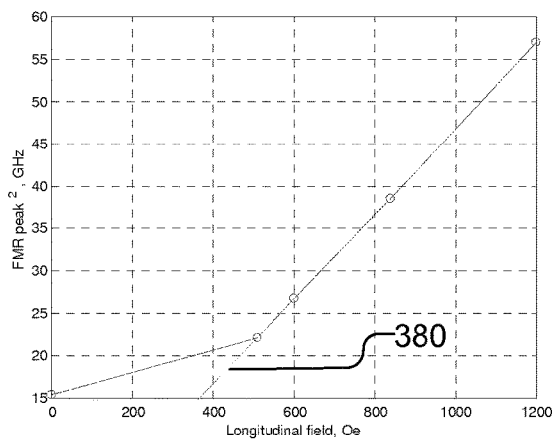
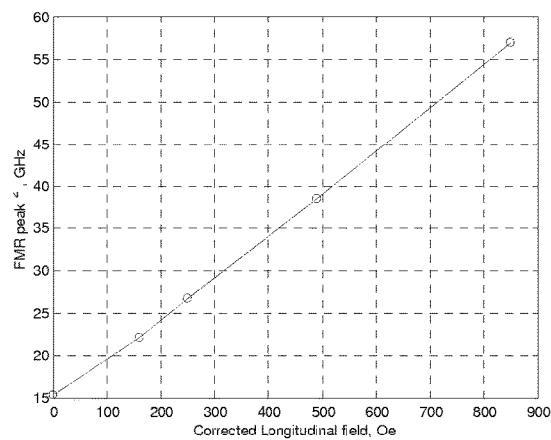
Fig. 16A                    Fig. 16B

READ SENSOR TESTING USING THERMAL MAGNETIC FLUCTUATION NOISE SPECTRA

FIELD OF THE INVENTION

The present application relates to testing magnetic media storage devices and in particular to testing read sensors using thermal magnetic fluctuation noise spectra.

BACKGROUND

Storage devices based on magnetic recording technology are well known and are commonly used in devices such as computers and digital electrical household appliances. In operation, a magnetic write head is used to magnetize bits of data on the recording medium, commonly referred to as a hard disk, while a read sensor is used to read the bits of data from the hard disk.

It is desirable to test the read sensors early in the manufacturing process to increase yield and reduce costs. Unfortunately, conventional testing techniques for characteristics of the read sensor, such as track width, require completion of the manufacturing process, i.e., installation of the sensor in a head gimbal assembly, and testing the performance of the completed device. Measurement of, e.g., track width, of the read sensor is done while operating the head in an actual hard disk drive (HDD) or an expensive spinstand tester that emulates the actual HDD operation. Moreover, while other characteristics of the read head, such as stripe height, are measured during manufacture, these measurements are generally inaccurate. Accordingly, improved techniques for measuring characteristics of the read sensor are desired.

SUMMARY

In accordance with an embodiment of the present invention, a read head is tested by measuring the thermal magnetic fluctuation noise spectra. In one embodiment, a non-uniformity in the magnetic field of the free layer is produced. The non-uniformity in the magnetic field of the free layer that is produced is in addition to any intrinsic non-uniformities in the magnetic field of the free layer. A thermal magnetic fluctuation noise spectrum is measured. The spectrum may be measured when an external magnetic field is applied or without an external magnetic field. A peak in the thermal magnetic fluctuation noise spectra, which follows the ferromagnetic resonance peak, is used to derive the desired dimension, such as track width and stripe height. The desired dimension is then stored e.g., in memory in a processor or by displaying the dimensions. If desired, the resulting measurement may then be fed back into the process control for the production of the read heads.

In one embodiment, an apparatus includes a magnetic field generator for applying an external magnetic field to a read sensor and a high frequency probe, e.g., greater than 1 GHz, that is to be coupled to the read sensor. A high frequency spectrum analyzer is coupled to the probe and to a processor. The analyzer records thermal magnetic fluctuation noise spectra from a read sensor that has a non-uniformity in the magnetic field of the free layer that is in addition to any intrinsic non-uniformities in the magnetic field of the free layer. The processor includes a computer-usable medium having computer-readable program code embodied therein for causing the processor to control the magnetic field generator to apply an external magnetic field with an orientation along a first direction to the read sensor while the high frequency spectrum analyzer records a thermal magnetic fluctuation noise spectrum from the read sensor. The code also causes the processor to analyze the thermal magnetic fluctuation noise spectrum to determine a dimension along the first direction of the free layer in the read sensor and to store the determined dimension of the free layer.

In another embodiment, an apparatus includes a magnetic field generator for applying an external magnetic field to a read sensor and a high frequency probe, e.g., greater than 1 GHz, that is to be coupled to the read sensor. A high frequency spectrum analyzer is coupled to the probe and to a processor. The analyzer records thermal magnetic fluctuation noise spectra from a read sensor. The processor includes a computer-usable medium having computer-readable program code embodied therein for causing the processor to control the magnetic field generator to apply an external magnetic field to the read sensor at an orientation that is non-parallel to a longitudinal direction of a free layer to produce a non-uniformity in a magnetic field of the free layer that is in addition to any intrinsic non-uniformities in the magnetic field of the free layer. The code also causes the processor to analyze the thermal magnetic fluctuation noise spectra to determine a dimension along a first direction of the free layer in the read sensor and to store the determined dimension of the free layer.

In another embodiment, a first thermal magnetic fluctuation noise spectrum is measured from a read sensor when no external magnetic field is applied to the read sensor. The first spectrum includes a first ferromagnetic resonance peak with a first frequency. A first external magnetic field is applied to the read sensor. The first external magnetic field has a first magnitude and an orientation that is parallel to a longitudinal dimension of a free layer of the read sensor. A second thermal magnetic fluctuation noise spectrum is measured when the first external magnetic field is applied to the read sensor. The second spectrum includes a second ferromagnetic resonance peak with a second frequency from the read sensor. The first magnitude of the first external magnetic field is adjusted by an offset value that represents the difference between a magnitude of an applied external magnetic field and a magnitude of a resulting magnetic field within the free layer. The hard bias stiffness is then determined based on the adjusted first magnitude, the first frequency, and the second frequency and the determined hard bias stiffness is stored.

In another embodiment, a first external magnetic field is applied to a read sensor. The first external magnetic field has an orientation that is parallel to a magnetic orientation of a reference layer of the read sensor. A first thermal magnetic fluctuation noise spectrum is measured from the read sensor when the first external magnetic field is applied. The first spectrum includes a first ferromagnetic resonance peak. A second external magnetic field is applied to the read sensor. The second external magnetic field has an orientation that is anti-parallel to the magnetic orientation of the reference layer of the read sensor. A second thermal magnetic fluctuation noise spectrum is measured from the read sensor when the second external magnetic field is applied. The second spectrum includes a second ferromagnetic resonance peak. The frequencies and/or the amplitudes of the first ferromagnetic resonance peak and the second ferromagnetic resonance peak are then compared to determine a strength value of the reference layer, and the strength value of the reference layer is stored. If desired, the second external magnetic field may be applied before the first external magnetic field.

BRIEF DESCRIPTION OF THE DRAWINGS

FIGS. 10A, 10B, and 10C are a perspective and top views of applying external magnetic fields to a read head in bar form.

FIG. 15 illustrates the FMR peak shift for different external longitudinal magnetic fields.

FIGS. 16A and 16B illustrate the linear dependence of the square of the FMR peak frequencies with respect to the applied external magnetic fields and determining a critical field value.

DETAILED DESCRIPTION

Figure 1:
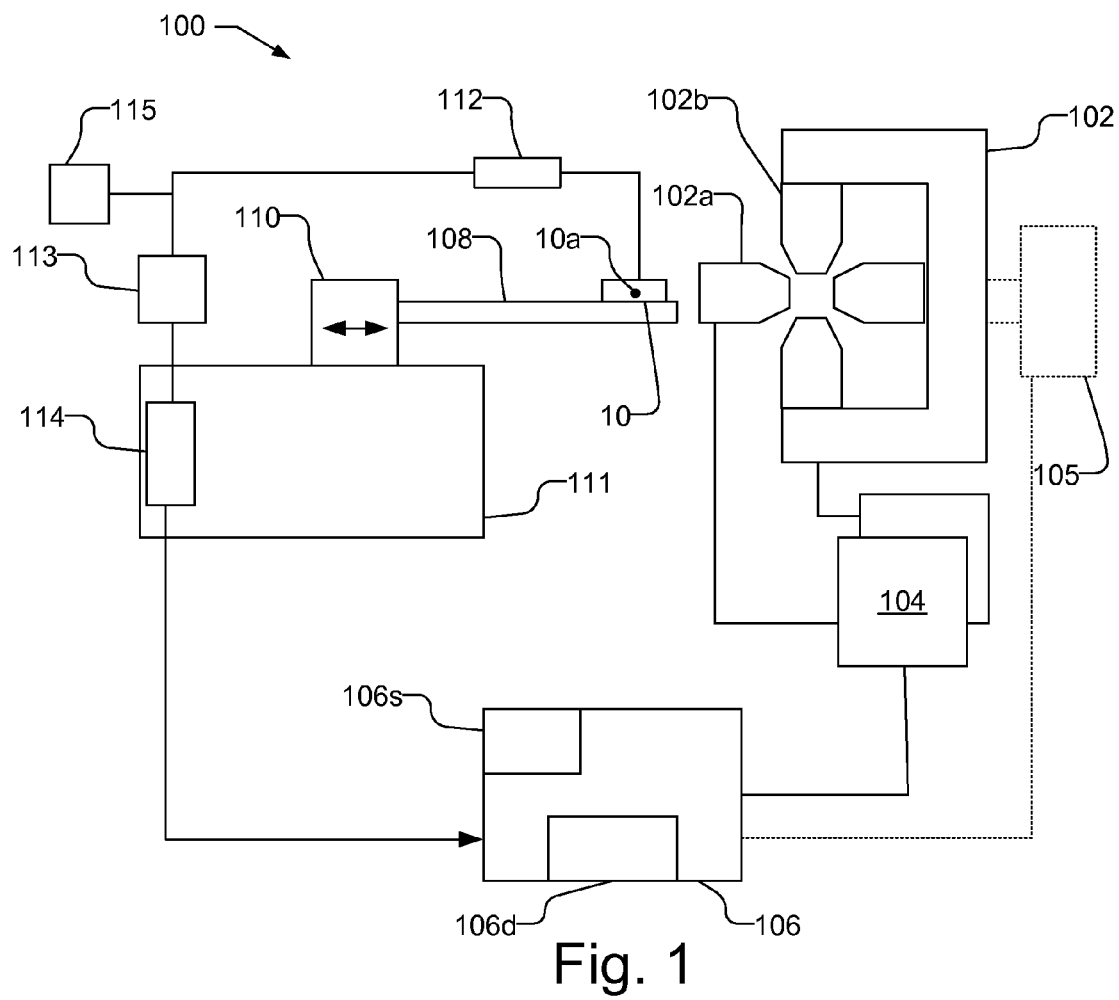
FIG. 1 is a schematic illustration of a read sensor test device that tests the read sensor using thermal magnetic fluctuation noise spectra in accordance with an embodiment of the present invention.

FIG. 1 is a schematic illustration of a read sensor test device 100 that tests the read sensor 10a of a head 10 using the thermal magnetic fluctuation noise spectra in accordance with an embodiment of the present invention. Testing device 100 includes at least one pair of electromagnetic coils 102, which e.g., is a C-core electromagnetic coil with windings, for producing desired magnetic fields to the read sensor of the head 10 under test. By way of example, FIG. 1 illustrates two pairs of electromagnetic coils 102a, and 102b, but if desired, additional or fewer coils may be used. The electromagnetic coils may include a core or may be air coil magnets. Power supplies 104 are connected to and provide the excitation currents to the electromagnetic coils 102a and 102b to produce the desired magnetic field.

The head 10 under test is mounted on an arm 108 that is coupled to a base 111 by an actuator 110 for translating the read sensor of the head 10 in and out of the test area between the electromagnetic coils 102a and 102b. It should be understood that the present invention may be used with heads 10 in various stages of manufacturing including bar level, slider level, and head gimbal assembly level or other state of manufacture.

A high frequency probe 112 is coupled to the read sensor of the head 10 to a high frequency spectrum analyzer 114 through a read amplifier 113. A T bias circuit 115 may be coupled between the high frequency probe 112 and the read amplifier 113. By way of example, the high frequency probe 112 and spectrum analyzer 114 operate in GHz range and greater. The high frequency spectrum analyzer 114, by way of example may be a HEWLETT PACKARD HP8562E spectrum analyzer. The T Bias circuit 115 may be produced by AEROFLEX CORPORATION, for example model 8810KMF2-40.

The spectrum analyzer 114 is connected to the processor 106, which receives and analyzes the data provided by the spectrum analyzer 114. The processor 106 includes a computer-usable medium having computer-readable program code embodied therein for causing the processor to control the tester and to perform a desired analysis, as described herein. The data structures and software code for automatically implementing one or more acts described in this detailed description can be implemented by one of ordinary skill in the art in light of the present disclosure and stored on a computer readable storage medium, which may be any device or medium that can store code and/or data for use by a computer system such as processor 106. This includes, but is not limited to, magnetic and optical storage devices such as disk drives, magnetic tape, compact discs, and DVDs (digital versatile discs or digital video discs), and computer instruction signals embodied in a transmission medium (with or without a carrier wave upon which the signals are modulated). The processor 106 includes storage/memory 106s and a display 106d for storing and/or displaying the results of the analysis of the data.

If desired, the tester 100 may include additional circuitry that may be coupled to the head for additional measurements of the head, e.g., write head measurements.

Figure 2A:
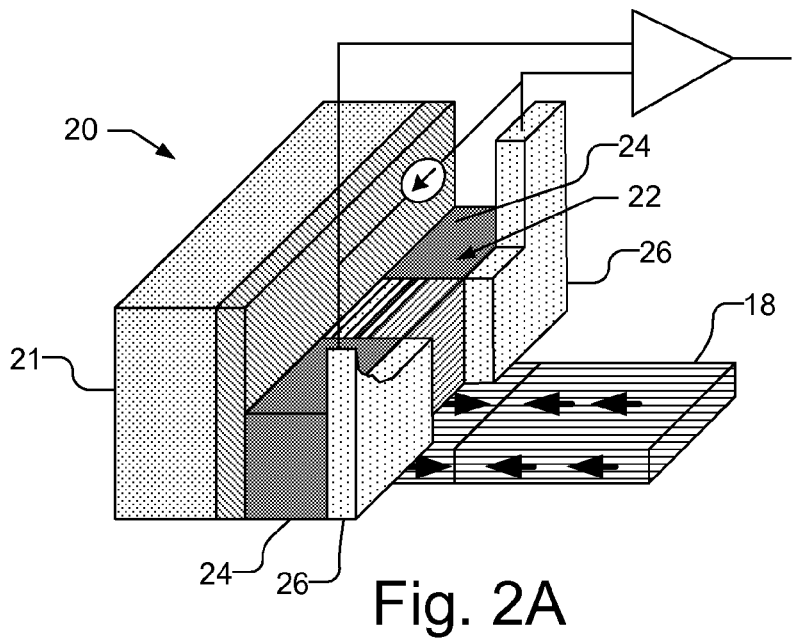
FIGS. 2A and 2B illustrate a perspective view and a cross-sectional view of a giant magnetoresistive (GMR) read sensor.
Figure 2B:
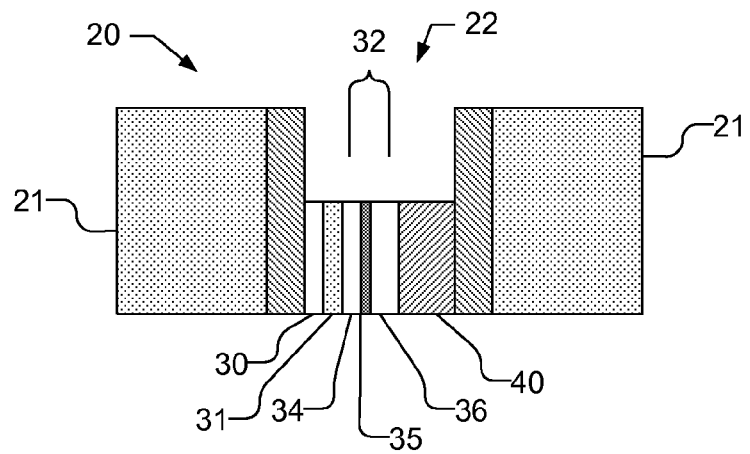
Figure 2C:
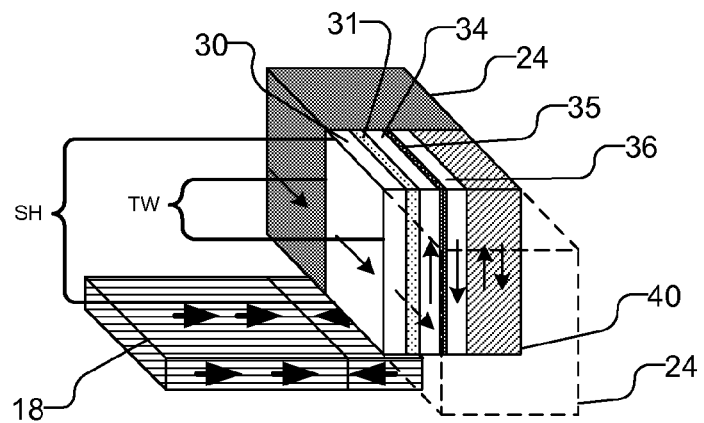
FIG. 2C illustrates a perspective view of a spin valve sensor in GMR read sensor.

Tester 100 uses thermal magnetic fluctuation noise spectra to test read sensors 10a. FIG. 2A illustrates a perspective view of a read sensor 20 in the form of a giant magnetoresistive (GMR) read sensor, over a track on a recording media 18 for reference purposes. FIG. 2B illustrates a cross-sectional view of the GMR read sensor 20. FIG. 2C illustrates a perspective view of the spin valve sensor 22 with the permanent magnets 24 over a track of the recording media 18, again for reference. The GMR read sensor 20 includes a multilayer film that forms a spin valve sensor 22 between two permanent magnets 24, which produce a cross-track longitudinal bias field. A bias current is applied through leads 26 and flows in the cross-track direction, as illustrated in FIG. 2A. An external magnetic field from the recording media 18 causes a change in the resistance spin valve sensor 22, which can be used to read the data on the recording media 18.

As illustrated in FIG. 2B, the spin valve sensor 22 is sandwiched between soft magnetic shields 21. The spin valve sensor 22 includes a free layer 30 (NiFe/CoFe), which is the sensitive part of the spin valve sensor 22. A synthetic anti-ferromagnetic layer (SAF layer) 32 includes two oppositely magnetized layers, the reference layer 34 and the pinning layer 36 with a layer 35 (Ru) in between. A copper layer 31 is disposed between the reference layer 34 and the free layer 30. Farthest away from the free layer 30 is an antiferromagnetic layer 40.

As illustrated in FIG. 2C, the magnetic field of the free layer in the absence of an external magnetic field is parallel to the air bearing surface (ABS) (the plane at the bottom of the sensor 20) in the longitudinal direction, i.e., cross track direction, and is aligned with the hard bias field created by the two permanent magnets 24. While there may be some small intrinsic non-uniformities in the magnetic field of the free layer on the micro-level, at the macro level the magnetic field of the free layer is in the longitudinal direction. The structure of the spin valve sensor 22 is designed to keep the reference layer 34 magnetized perpendicular to the ABS surface, and the pinning layer 36 is used to minimize the stray magnetic field imposed by the reference layer 34 in the free layer 30. As the spin valve sensor 22 passes above a magnetic transition in the recording media 18, the magnetization of the free layer 30 rotates "up" or "down" depending on the transition polarity. The rotation of magnetization causes a change of the sensor resistance due to the GMR (giant magnetoresistivity) effect, which is used to read the data on the recording media 18.

The longitudinal magnetization orientation of the free layer 30 is ideally "designed" by the film structure, e.g. by applying proper orientation magnetic field during film sputtering (so called magnetic anisotropy). Longitudinal as used herein is defined as being in the direction of track width TW of the free layer 30, i.e., along the cross-track direction. Additionally, the term perpendicular as used herein is defined as being orthogonal to the longitudinal direction and in the plane of the free layer 30, i.e., along the direction of the stripe height SH of the free layer 30. However, there are also shape dependencies (shape anisotropy) and domains. For example, if the stripe height SH (FIG. 2C) of the sensor is large and track width TW (FIG. 2C) is small, magnetization can tilt in the vertical direction. In order to minimize these effects, the permanent magnets 24 are used. The permanent magnets 24 have a longitudinal magnetization orientation, as illustrated in FIG. 2C, that provides a "bias" magnetic field to align the free layer 30 in the longitudinal state and, ideally, make the free layer 30 uniform, i.e. wipe out the magnetic domains at the edges of the free layer 30. Without the hard bias from the permanent magnets 24, the spin valve sensor 22 will form several separate domain regions, with predominantly vertical magnetization at the edges, creating instability and hysteresis of the read head response.

Figure 3:
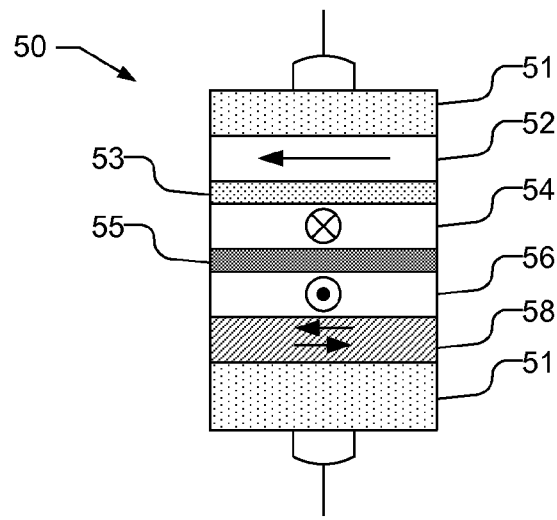
FIG. 3 illustrates a bottom view of a tunneling junction magnetoresistive (TMR) read sensor.

Another type of read head uses a tunneling junction magnetoresistive (TMR) sensor, which is illustrated in an ABS, i.e., bottom, view in FIG. 3. Similar to the GMR sensor 20, the TMR sensor includes a free layer 52 that is separated from a reference layer 54 by a barrier layer 53. As with a GMR sensor 20, the free layer 52 and reference layer 54 have orthogonal magnetization orientations, and a pinning layer 56 and a antiferromagnetic layer 58 are used, with another barrier layer 55 between the reference layer 54 and the pinning layer 56. The TMR sensor 50 also includes leads 51 as well as permanent magnets (not shown) that have longitudinal magnetization orientations to a "bias" magnetic field in the free layer 52. For purposes of this disclosure, a TMR sensor and a GMR sensor are interchangeable, and therefore the reference to one is not intended as the exclusion of the other.

Two characteristics of read sensors that are desirable to measure are the track width TW and stripe height SH (illustrated in FIG. 2C). Conventionally, the stripe height SH is not directly measured, but is merely estimated during manufacture using a reference signal from a device referred to as an electrical lapping guide (ELG) that is embedded in the head. The track width TW is conventionally measured after manufacture by testing the performance of the completed device. The device must be completed because the measurement is conventionally performed while operating the head in an actual hard disk drive or an expensive spinstand tester, which emulates the actual HDD operation.

It has been suggested that the track width TW and strip height SH can be directly measured in some read heads using the thermal magnetic fluctuation noise spectra. Two articles that discuss measuring dimensions of the sensor using thermal magnetic fluctuation noise are Klaas B. Klaassen et al., "Broad-Band Noise Spectroscopy of Giant Magnetoresistive Read Heads", IEEE Transactions on Magnetics, Vol. 41, No. 7, July 2005, pp. 2307-2317; and Jack C. L. van Peppen et al., "A New Approach to Micromagnetic Simulation of Thermal Magnetic Fluctuation Noise in Magnetoresistive Read Sensors, IEEE Transactions on Magnetics, Vol. 42, No. 1, January 2006, pp. 56-69, both of which are incorporated herein by reference. Unfortunately, the thermal magnetic fluctuation noise spectra necessary to determine the track width TW and stripe height SH dimensions of the sensor is observable only in sensors that exhibit non-uniformities, as noted in "A New Approach to Micromagnetic Simulation of Thermal Magnetic Fluctuation Noise in Magnetoresistive Read Sensors", pp. 69. Accordingly, only defective, strongly non-uniform read sensors can be measured using this technique, and the dimensions of good sensors can not be determined. Consequently, the measurement technique has limited practical value in production.

Figure 4A:
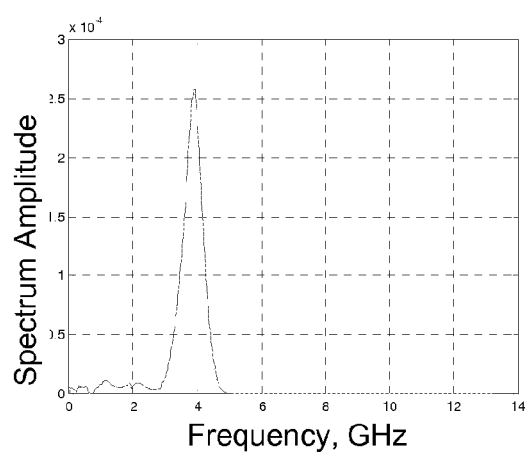
FIGS. 4A and 4B are example of thermal magnetic fluctuation noise spectra from a TMR sensor without and with a non-uniformity in the magnetic field of the free layer.
Figure 4B:
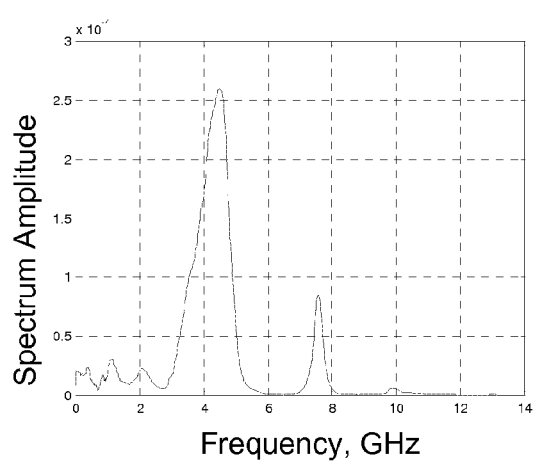

Using the tester 100 shown in FIG. 1, the high frequency thermal fluctuation noise can be measured in a read sensor, e.g., between 1 GHz to 10 GHz, which is above the intended operating range of the sensor in the actual HDD. Ferromagnetic resonance conditions in the read sensor forms a primary noise peak, such as that shown in FIG. 4A. FIG. 4A is an example of a thermal magnetic fluctuation noise spectrum from a TMR sensor with little or no non-uniformities. As can be seen in FIG. 4A, a single primary FMR peak occurs at approximately 3.9 GHz. FIG. 4B, on the other hand, illustrates thermal magnetic fluctuation noise spectrum for a TMR sensor with approximately 73 nm track width TW and a 98 nm stripe height SH with a non-uniformity in the magnetic field of the free layer that produces not only an FMR peak at 4.4 GhZ, but also secondary peak at 7.5 GHz and a third peak at 10 GHz. The secondary peak is referred to herein as a "secondary" peak as it the closest peak to the primary FMR peak that is caused by standing waves. The secondary peak has a higher frequency and smaller amplitude than the FMR peak. Similarly, the third peak is referred to as the "third" peak, as it is the peak that is caused by standing waves that is closest to the secondary peak and has a higher frequency and smaller amplitude than the secondary peak. Peaks formed by standing waves can be recognized by applying external magnetic fields of different magnitudes and observing a corresponding shift in the frequency of the peak. Dimensional information can be derived from the secondary peak and third peak, shown in FIG. 4B, but as illustrated in FIG. 4A, not all read sensors produce these peaks.

In accordance with an embodiment of the present invention, characteristics of a read sensor, such as track width and/or stripe height are measured in a read sensor from the thermal magnetic fluctuation noise spectra by intentionally creating a non-uniformity in the magnetic field of the free layer in the read sensor that is in addition to any intrinsic non-uniformities in the magnetic field of the free layer. Once the non-uniformity in the magnetic field is created, the thermal magnetic fluctuation noise is measured and used to determine the track width or stripe height. The thermal magnetic fluctuation noise spectrum may be measured while the read sensor is held in an external magnetic field. In one embodiment, the thermal magnetic fluctuation noise spectrum is measured without using an external magnetic field. The non-uniformity in the magnetic field of the free layer can then be removed prior to use of the head.

Figure 5:
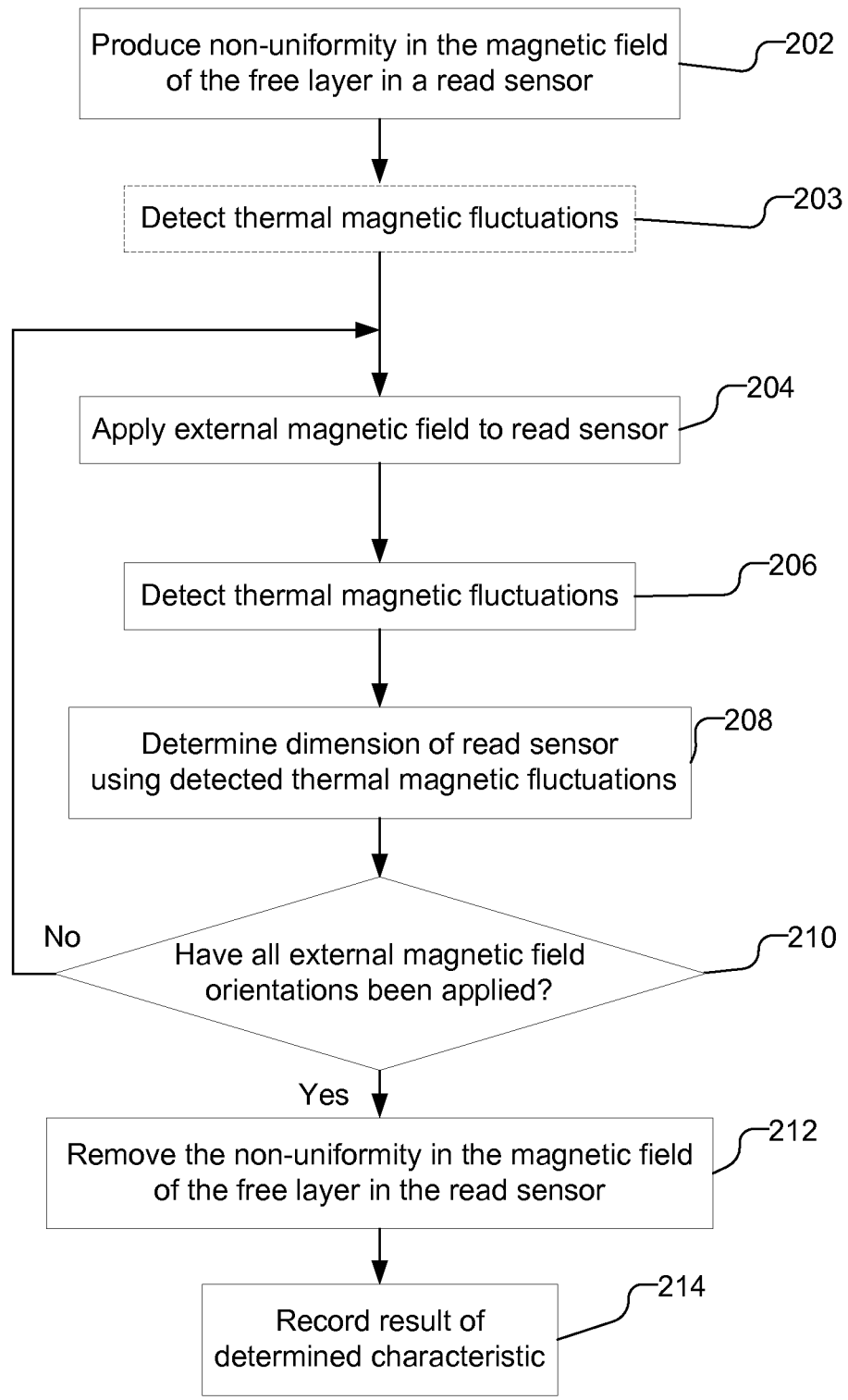
FIG. 5 is a flow chart illustrating a method of measuring a characteristic of a read sensor using the thermal magnetic fluctuation noise spectra in accordance with an embodiment of the present invention.
Figure 6A:
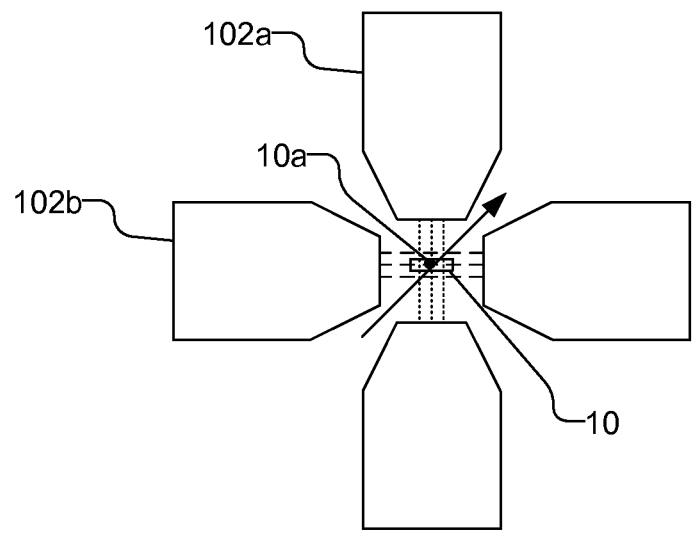
FIGS. 6A and 6B illustrate different embodiments of applying a non-longitudinal magnetic field to a read sensor.
Figure 6B:
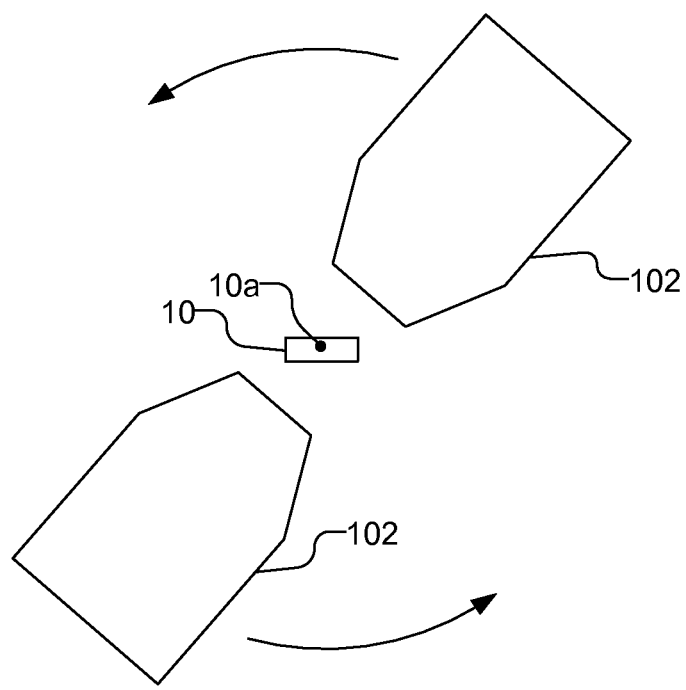

FIG. 5 is a flow chart illustrating a method of measuring a characteristic of a read sensor, e.g., using tester 100, shown in FIG. 1, in accordance with an embodiment of the present invention. First, a non-uniformity in the magnetic field of the free layer in the read sensor is produced (202). The non-uniformity in the magnetic field is in addition to any intrinsic non-uniformities that may be present in the magnetic field of the free layer. The non-uniformity in the magnetic field of the free layer may be produced by applying a strong magnetic field to the read sensor with an orientation that is non-parallel with the desired longitudinal magnetic field orientation of the permanent magnets. By way of example, a 45° angle magnetic field that is 2000 Oe to 3000 Oe or greater may be used. The non-longitudinal magnetic field may be applied, e.g., by the electromagnetic coils 102a and 102b as illustrated in FIG. 6A. As shown in FIG. 6A, a head 10 with a read sensor 10a is between electromagnetic coils 102a and 102b that are producing magnetic fields to produce a combined magnetic field that is at 45° with respect to the head, as illustrated by the arrow. In another embodiment a rotating electromagnetic coil 102 may be used as illustrated in FIG. 6B, in which the electromagnetic coil 102 is oriented at 45° with respect to the head 10 with read sensor 10a. The orientation of the rotating electromagnetic coil 102 is controlled by actuator 105 and processor 106, illustrated in FIG. 1. Alternatively, the non-longitudinal magnetic field may be applied to the read sensor prior to installation in the tester 100.

Figure 7A:
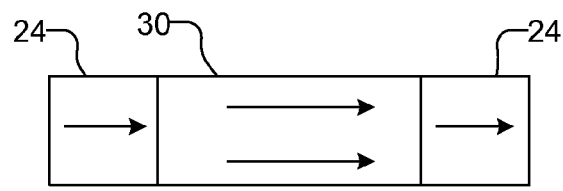
FIGS. 7A and 7B illustrate a simplified view of a free layer between permanent magnets and a simulated magnetic field in the permanent magnets and the free layer.
Figure 7B:
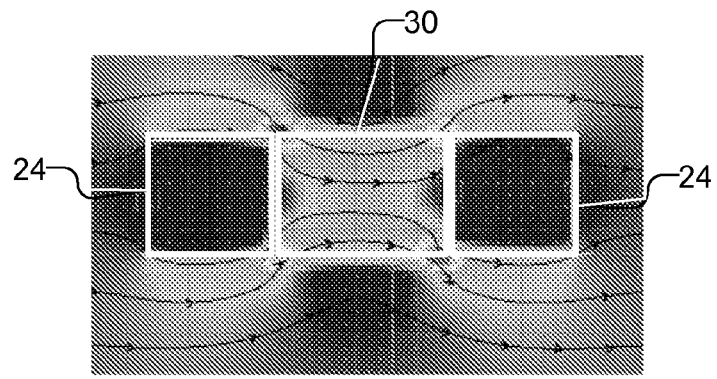

FIGS. 7A, 7B and 8A, 8B illustrate producing a non-uniformity in the magnetic field of the free layer in the read sensor. FIG. 7A illustrates a simplified view of a free layer 30 between permanent magnets 24. As illustrated by the arrows in FIG. 7A, the permanent magnets 24 have conventionally desired longitudinal magnetization orientations, which bias the magnetic field in the free layer in the longitudinal direction. FIG. 7B illustrates a diagram of a simulated field in the permanent magnets 24 and the free layer 30. As can be seen, the field in the free layer 30 is symmetrically distorted.

Figure 8A:
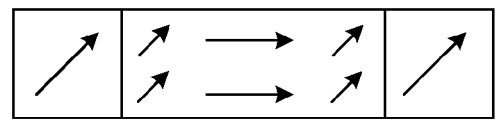
FIGS. 8A and 8B illustrate a simplified view of a free layer between permanent magnets where a non-uniformity in the magnetic field has been created and a simulated magnetic field in the permanent magnets and the free layer.
Figure 8B:
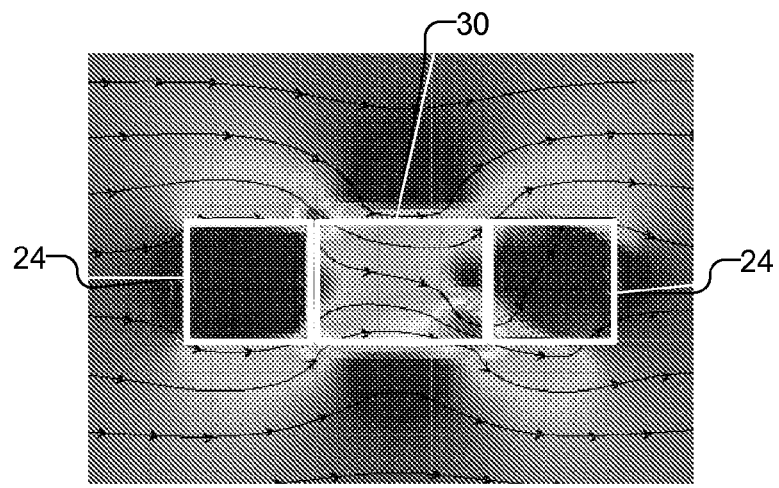

By applying a strong magnetic field to the read sensor with a non-parallel orientation to the longitudinal direction, the orientation of the magnetic field in the permanent magnets 24 is altered to a non-longitudinal state to approximately the orientation of the applied magnetic field as illustrated in FIG. 8A. It is believed that the closure domains at the edges of the permanent magnets 24 will form and that the left and right permanent magnets will tilt differently, forming non-uniform edge domains, which will produce differences in the "left-right" or "top-bottom" segments of the free layer 30 depending on the direction of an applied external field. In other words, a non-uniform, asymmetric magnetic field is produced in the free layer 30. FIG. 8B illustrates a diagram of a simulated field in the permanent magnets 24 and the free layer 30 with the altered orientation of the magnetic field in the permanent magnets 24. As can be seen, there is an asymmetrical distortion of the magnetic field in the free layer 30.

Figure 9A:
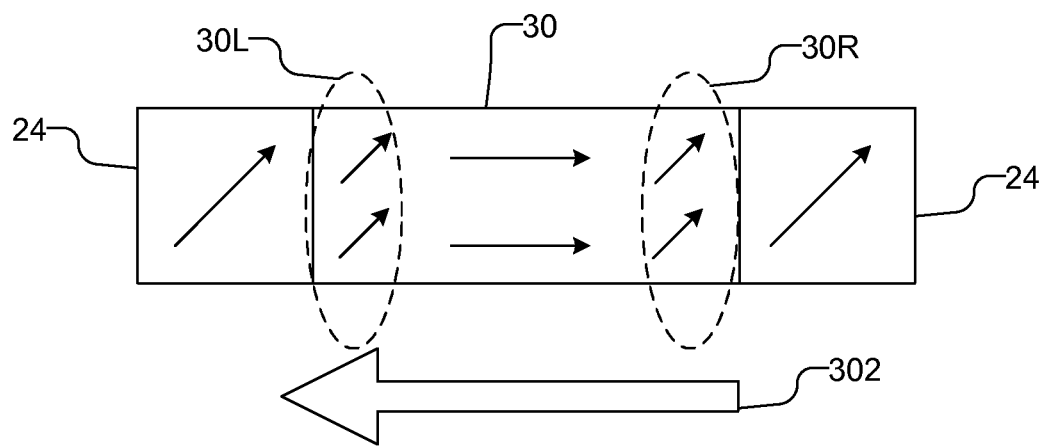
FIGS. 9A and 9B illustrate simplified views of the permanent magnets and free layer with external magnetic fields applied in longitudinal and perpendicular directions, respectively.
Figure 9B:
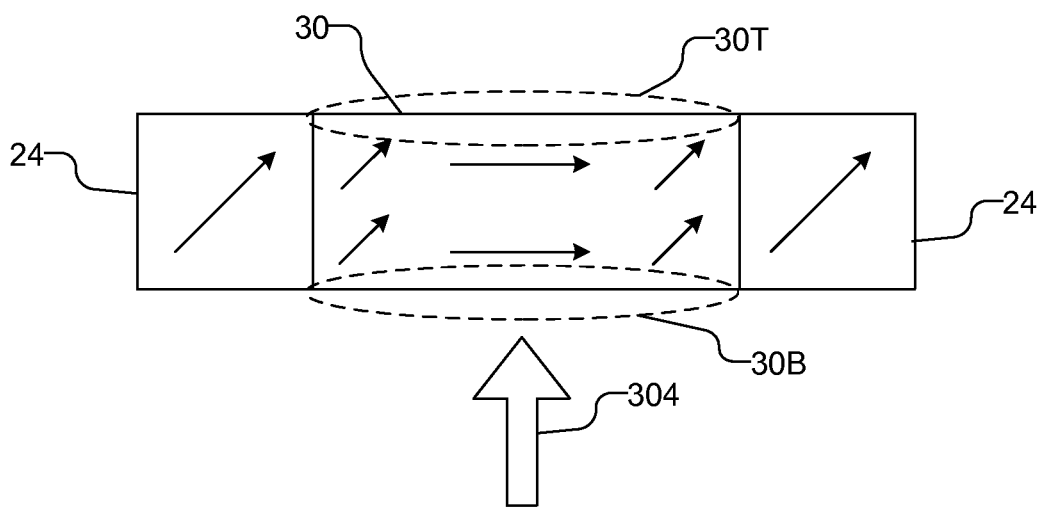

With a non-uniformity in the magnetic field of the free layer produced, an external magnetic field is applied to the read sensor (204). To measure the track width TW, an external magnetic field in the longitudinal direction is applied opposing the hard bias direction. FIG. 9A illustrates a simplified view of the permanent magnets 24 and free layer 30 with an external magnetic field 302 applied in a longitudinal direction opposing the hard bias direction. The right and left portions of the free layer 30 illustrated with ellipses 30R and 30L, respectively, are exposed to different magnetic fields, which will result in noise excitation in the longitudinal direction, which can be detected as peaks in the detected thermal magnetic fluctuation (206 in FIG. 5). To measure the stripe height SH, the external magnetic field is applied in the perpendicular direction. FIG. 9B illustrates a simplified view of the permanent magnets 24 and free layer 30 with an external magnetic field 304 applied in a perpendicular direction. In one embodiment, the external magnetic field may be applied in the same direction as the hard bias direction (taking into account the alteration to the hard bias direction), as in indicated in FIG. 9B and in another embodiment, the external magnetic field may be applied opposing the hard bias direction. With this configuration, the top and bottom portions of the free layer 30 illustrated with ellipses 30T and 30B, respectively, are exposed to different magnetic fields, which will result in noise excitation in the height direction, which, again, can be detected as peaks in the detected thermal magnetic fluctuation (206 in FIG. 5). The minimum strength of the magnetic field in the longitudinal or perpendicular direction that is sufficient to generate the peaks in the thermal magnetic fluctuation noise spectra varies for different types of sensors, but approximately 1000 Oe to 1300 Oe appears to be sufficient.

The longitudinal external magnetic field or perpendicular external magnetic field can be applied using the electromagnetic coils 102a or 102b shown in FIGS. 1 and 6A. Alternatively, a single electromagnetic coil 102, as illustrated in FIG. 6B may be rotated into the appropriate orientation to provide the desired external magnetic field. In another embodiment, illustrated in perspective and top views in FIGS. 10A, 10B, and 10C, the electromagnetic coils 102a and 102b can be used in conjunction to produce the desired longitudinal or perpendicular external magnetic fields. As illustrated in FIG. 10A, the head 10 with read sensor 10a, which is illustrated as being in a bar 11 in FIG. 10A, is placed between the electromagnetic coils 102a and 102b in a diagonal orientation by an arm 108, which moves in a direction that is at an acute angle with respect to the coils 102a and 102b, as illustrated by the arrows. The electromagnetic coils 102a and 102b have a non-parallel arrangement, e.g., in one embodiment they are arranged in 100-80-100-80 degree increments to increase the accessible area for the bar 11 and arm 108. In one embodiment, the coils 102a and 102b are orthogonally arranged. The probe card 112 is shown in FIG. 10A making contact with the read sensor in head 10. A longitudinal external magnetic field at the read sensor 10a in the head 10 can be generated using a configuration of the electromagnetic coils 102a and 102b as illustrated in FIG. 10B, e.g., with coils 102a1 and 102b1 acting as north poles and coils 102a2 and 102b2 acting as south poles. A perpendicular external magnetic field at the read sensor in the head 10 can be generated using a configuration of the electromagnetic coils 102a and 102b as illustrated in FIG. 10C, e.g., with coils 102a2 and 102b1 acting as north poles and coils 102a1 and 102b2 acting as south poles. Of course, the north and south poles may be switched to produce longitudinal and perpendicular magnetic fields in the opposite directions. Multiple heads in the bar 11 can be tested by positioning the desired head in between the electromagnetic coils 102a and 102b, however, it may be desirable to reapply a strong magnetic field to the read sensor with a non-parallel orientation to the longitudinal direction in each head prior to testing to ensure the presence of a non-uniformity in the magnetic field of the free layer.

Figure 11:
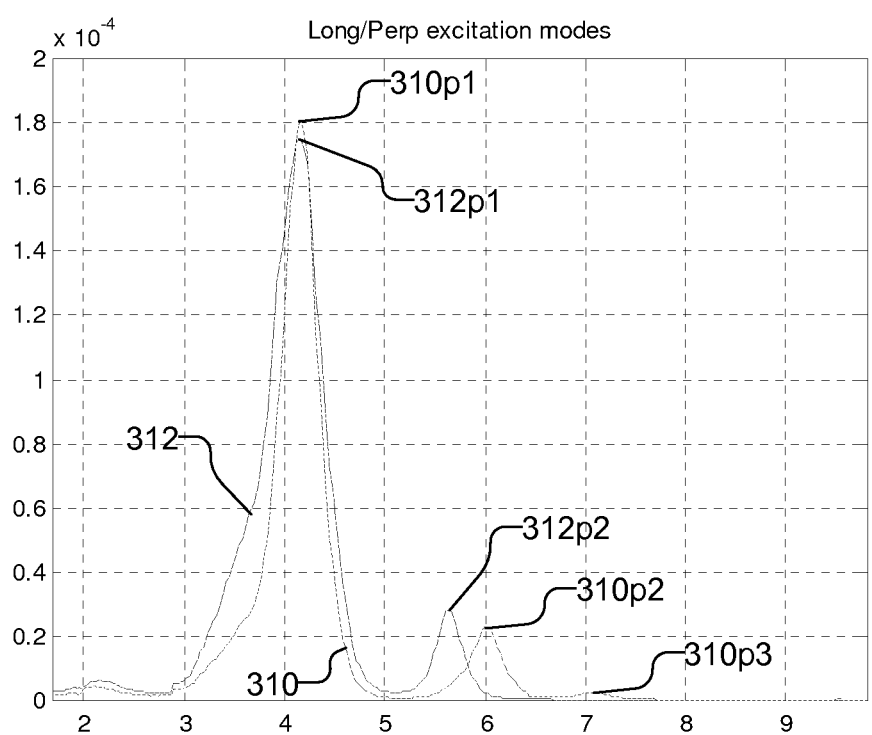
FIG. 11 illustrates thermal magnetic fluctuation noise spectra produced in a longitudinal field and in a perpendicular field after a non-uniformity in the magnetic field in the free layer of the read sensor has been produced.

With the external magnetic field applied, the thermal magnetic fluctuation noise can be measured at high frequencies, e.g., between 1 GHz and 10 GHz (206). Peaks in the measured thermal magnetic fluctuation noise spectrum can then be used to determine the dimension of the read sensor (208). FIG. 11, by way of example, illustrates thermal magnetic fluctuation noise spectra produced in a longitudinal field (curve 310) and in a perpendicular field (curve 312) after a read sensor has had a strong non-longitudinal magnetic field applied. The secondary peaks 310p2 and 312p2 in the spectra are used to determine the track width TW and stripe height SH, respectively.

The track width TW or stripe height SH can be determined based on the theory that propagation of noise waves gives rise to "standing wave" patterns in the spatial distribution of the magnetic noise in the free layer 30. These standing waves are due to the reflection at the edges of the sensor, and thus, an edge to edge determination can be made. The frequencies of the standing waves are given by the following equation:

$$f_N = \sqrt{f_0^2 + \left(\frac{NV_\infty}{2d}\right)^2} \quad \text{eq. 1}$$

where $f_0$ is the frequency of the primary FMR spectral peak, e.g., peak 310p1 or 312p1 in FIG. 11, N is the order of the standing wave (N=1, 2, . . . ), and d is the dimension being measured, i.e., track width TW or stripe height, depending on the orientation of the applied external magnetic field, and $f_N$ is the frequency of the standing wave of the Nth order The propagation velocity $V_\infty$ is approximately 882 m/s, which is determined by:

$$V_\infty = \gamma \sqrt{\frac{2A}{\mu_0}} \quad \text{eq. 2}$$

where $\gamma=2.21*10^5$ m/As is a gyromagnetic constant, $\mu_0=4\pi*10^{-7}$ A/m is the magnetic permeability, and $A=10^{-11}$ J/m and is the exchange of energy of the free layer. While most read sensors are currently designed based on similar NiFe films, a different material may be used in future designs. If different materials are used, the value of exchange energy A may become different and the value of velocity $V_\infty$ given by eq. (2) will need to be changed or calibrated, e.g. by recording or microscopy dimension analysis.

It is believed that the non-uniformity of the field distribution in the free layer 30 produces a strong $1^{st}$ order standing wave. Accordingly, the desired dimension d can be determined from equation 1 where N=1, where the frequency $f_N$ in equation 1 is the frequency of the secondary peak, e.g., peak 310p2 or 312p2 in FIG. 11. Using equation 1 and the spectra illustrated in FIG. 11 results in a track width dimension of 100 nm (with a track width target of 95 nm) and a stripe height of 120 nm (with a stripe height target of 110 nm).

As illustrated in FIG. 5, the process may be repeated if desired for another external magnetic field orientation (210). For example, if an external magnetic field with a longitudinal orientation was applied to determine the track width, the process may be repeated with an external magnetic field with a perpendicular orientation to determine the stripe height SH. When all external magnetic field orientations have been applied and spectra measured, the non-uniformity in the magnetic field of the free layer is removed (212), e.g., by applying a strong longitudinal magnetic field to the read sensor. The results from the measurement are recorded, e.g., by storing in memory 106s and/or displaying with display 106d.

In one embodiment, after the non-uniformity in the magnetic field of the free layer is produced (202), the thermal magnetic fluctuations may be detected (203), before an external magnetic field is applied to the read sensor (204). While the application of an external magnetic field consistently produces the secondary peak, it has been found that once the non-uniformity in the magnetic field of the free layer is produced, some read sensors will produce a secondary peak in the thermal magnetic fluctuations without the application of the external magnetic field. Accordingly, in one embodiment, the dimensions of the read sensor may be determined (208) using a secondary peak in the detected thermal magnetic fluctuation noise spectra (203) without the use of an external magnetic field (204). For example, in one embodiment, a secondary peak can be used to determine the stripe height SH and a third peak, e.g., similarly to the third peak 310p3 shown in FIG. 11, may be used to determine the track width TW. However, the correspondence of the secondary and third peaks to the stripe height SH and track width TW is not guaranteed, and thus, it may be desirable to also measure the thermal magnetic fluctuation noise spectra while the read sensor is in an external magnetic field (206). By way of example, the results from the two measurements, with and without the external magnetic field, can be compared or combined to improve the dimensional measurement, or to provide other information, such as the strength of the hard bias in the free layer, which is discussed below.

It should be understood that some acts in the measurement process may be performed in orders different than illustrated in FIG. 5. For example, the different magnetic field orientations may be applied prior to determining the dimensions of the read sensor illustrated in block 208. Further, the result of the measurement may be stored prior to removing the non-uniformity in the magnetic field of the free layer. Moreover, there is no temporal constraint for removing the non-uniformity in the magnetic field of the free layer (212) and that the may be done anytime prior to using the read sensor.

In one embodiment, the measurement of a dimension of the read sensor, e.g., the stripe height SH, is used to calibrate the lapping operation used in the manufacture of the heads. During manufacture, the stripe height SH of the sensor in a head is reduced when forming the air bearing surface (ABS) by a lapping procedure in which material is removed using an abrasive slurry. The lapping procedure must be carefully controlled in order to avoid removing too much material. Conventionally, an element known as an electrical lapping guide (ELG) is embedded in the head and is monitored during the lapping process. Material from the ELG is removed, along with material from the read sensor, during the lapping process. As material from the ELG is removed, the measured resistance in the ELG increases. When the measured resistance from the ELG reaches a particular value, the lapping process is stopped. However, there is no direct correlation between the ELG resistance and the stripe height of the read sensor.

Figure 12:
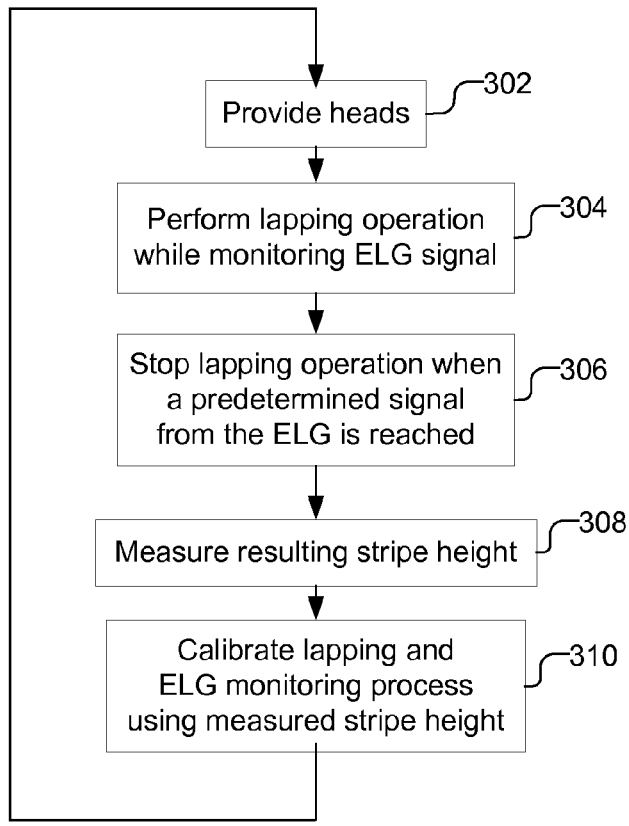
FIG. 12 is a flow chart illustrating the process of forming heads using a lapping operation that is calibrated using the thermal magnetic fluctuation noise spectra stripe height measurements.

FIG. 12 is a flow chart illustrating the process of forming heads using a lapping operation that is calibrated using stripe height measurements. As shown in FIG. 12, heads are provided (302), e.g., in bar form, for the lapping operation. A lapping operation is performed while monitoring the ELG signal (304). Lapping heads while monitoring the ELG signal is known in the art, and is described, e.g., in U.S. Pat. Nos. 5,991,698 and 6,532,646 both of which are incorporated herein by reference. When the ELG signal reaches a predetermined level, the lapping operation is stopped (306). The resulting stripe height is then measured (308) as described in FIG. 5. The lapping and ELG monitoring operation can then be calibrated using the measured stripe height SH (310). The predetermined ELG signal to signify stopping the lapping process is correlated with a measured stripe height SH. The value of the predetermined ELG signal to stop the lapping operation can be revised, i.e., increased or decreased, to adjust the desired stripe height SH being produced. Additional heads are then produced using the lapping and ELG monitoring operation that is calibrated with the measured stripe height SH.

Figure 13:
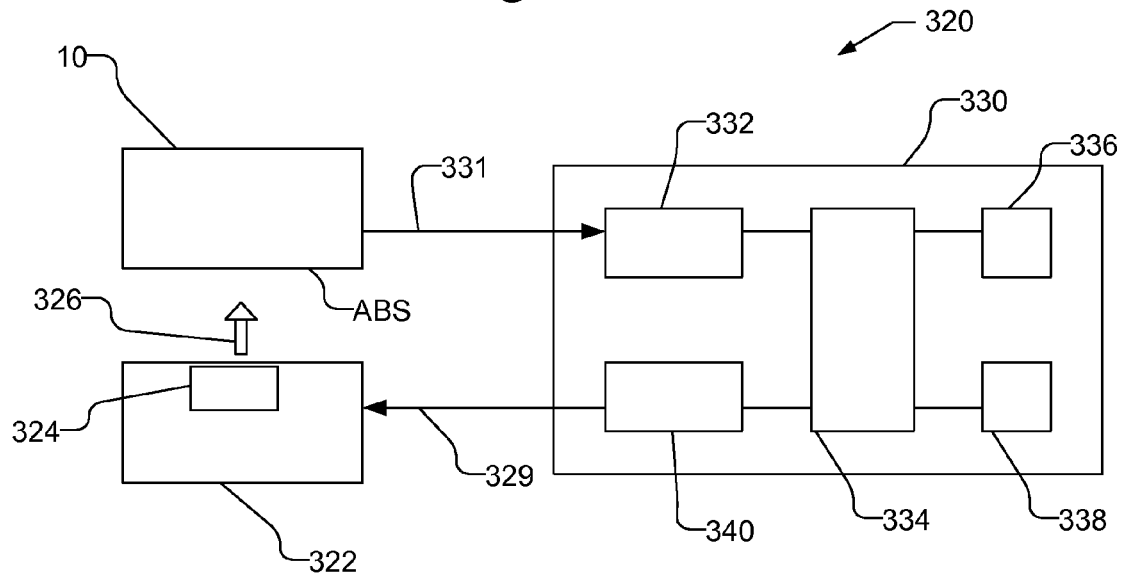
FIG. 13 is a block diagram of a lapping device with an in-situ stripe height SH measurement according to an embodiment of the present invention.

In another embodiment, the stripe height measurement is performed in-situ with the lapping operation. FIG. 13 is a block diagram of a lapping device 320 with in-situ stripe height SH measurement according to an embodiment of the present invention. The lapping device 320 may be similar to that described in U.S. Pat. No. 7,147,539, which is incorporated herein by reference, except the thermal magnetic fluctuation noise spectra is used to determine stripe height as opposed to monitoring the change in resistance or amplitude in the electrical response signals from the read element. As illustrated in FIG. 13, lapping device 320 includes a control system 330 and a material removal device 322 that operates on bar with heads 10 having an air bearing surface (ABS). The control system 330 comprises a data acquisition unit 332, a processor 334, a user input 336, a display 338, and drivers 340 which control the material removal device 322. The control system 330 directs the material removal process with a connection 329 between the material removal device 322 and the control system 330. Feedback from thermal magnetic fluctuations in the head 10 is provided to the data acquisition unit 332 by feedback connections 331. A perpendicular external magnetic field, illustrated by arrow 326, is applied to the head 10 by magnets 324 in the material removal device 322.

The material removal device 322 may comprise any suitable lapping mechanism or process, such as a slurry process, a polishing plate using free abrasives such as alumina or diamond dust, or a polishing plate having an abrasive embedded in the plate. In addition, the material removal device 322 may utilize an etching process.

As described above, to measure the stripe height SH, a non-uniformity in the magnetic field of the free layer is produced in the head 10, which can be done, e.g., prior to installation of the head 10 in the lapping device 320 or while the head 10 is in the lapping device 10. As the ABS of the head 10 is lapped, a perpendicular external magnetic field 324 is applied to the head 10 and the thermal magnetic fluctuations are acquired by data acquisition unit 332 via the feedback connections 331. The processor 334, which similar to processor 106, uses the secondary peak in the thermal magnetic fluctuation noise spectra to determine the stripe height SH of the head 10, as discussed above. The processor 334 includes a computer-usable medium having computer-readable program code embodied therein for causing the processor to control the material removal process, e.g., via driver 340, in response to the measured stripe height SH. In one embodiment, the stripe height SH may be measured simultaneously with the lapping, but in other embodiments, the lapping and measuring of stripe height are performed serially.

Figure 14:
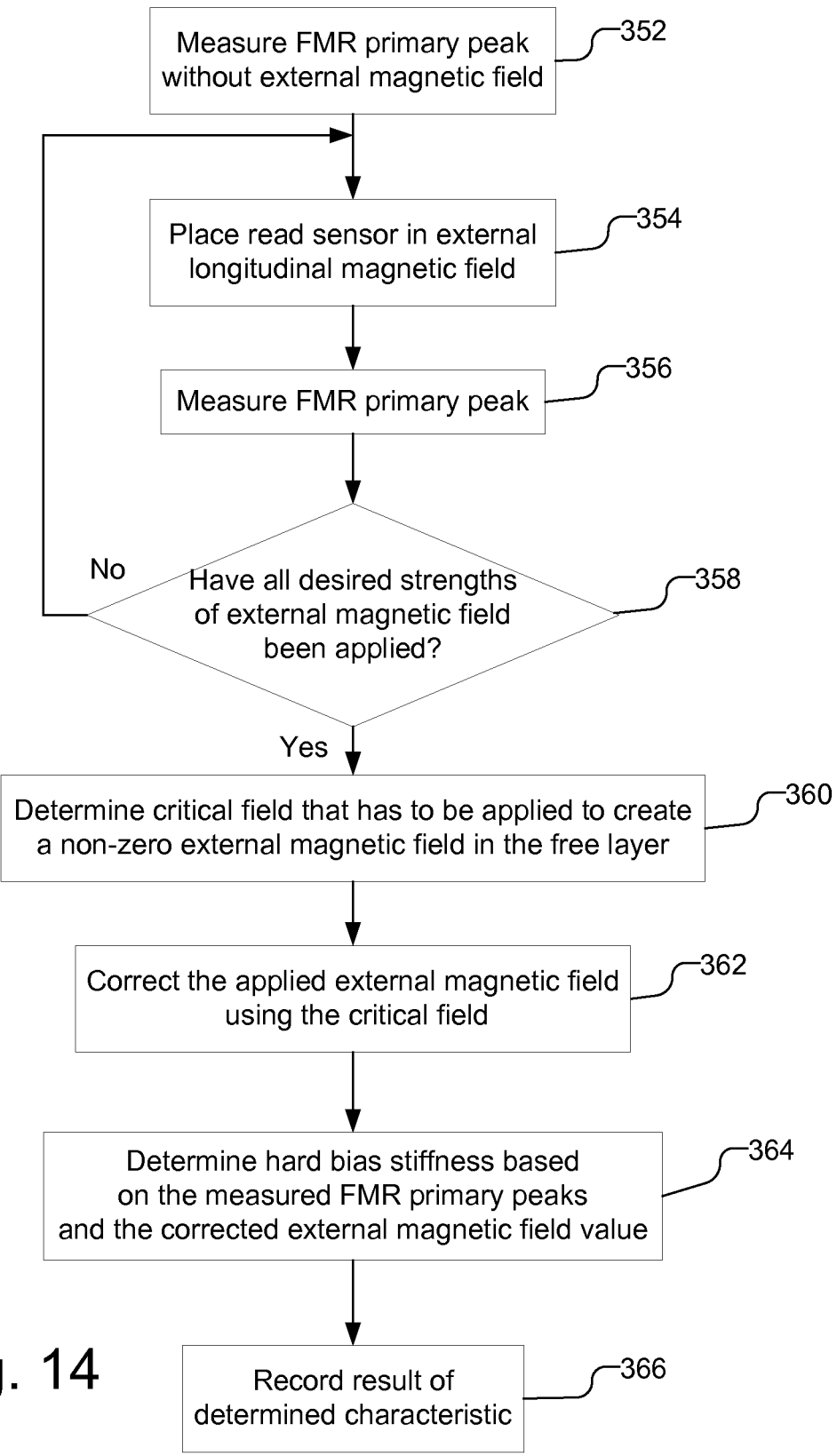
FIG. 14 is a flow chart of measuring the stiffness of the hard bias of the free layer using a FMR peak in the thermal magnetic fluctuation noise spectra.

Another analysis that the tester 100, shown in FIG. 1, can perform is a measurement of the stiffness of the hard bias of the free layer 30 as illustrated in FIG. 14. This test does not require a non-uniformity in the magnetic field of the free layer, so the stiffness test may be performed prior to measuring the track width TW and/or stripe height SH of the sensor, as discussed above.

As illustrated in FIG. 14, the thermal magnetic fluctuation noise of the read sensor in a head is measured to determine the primary FMR peak without an applied external magnetic field (352). The read sensor is then placed in an external longitudinal magnetic field (354). In one embodiment, the external longitudinal magnetic field is applied in the direction of the hard bias, but if desired, the applied external magnetic field may be opposite the hard bias direction. It should be understood that the term "longitudinal" as used in reference to the applied external magnetic field, need not be perfectly longitudinal, but should have a sufficient longitudinal component that the desired effect is achieved without creating other effects that obfuscate the measurement. The thermal magnetic fluctuation noise of the head is measured while in the external magnetic field to determine the primary FMR peak (356). Additional FMR peaks may be measured using another external longitudinal magnetic with a different magnitude if desired (358). Using different magnitudes of external magnetic fields results in the shifting of the frequency of the FMR peak. FIG. 15 illustrates the FMR peak shift for different external longitudinal magnetic fields, in the direction of the hard bias. If the applied external magnetic field is opposite the hard bias direction, the FMR peak shifts in the opposite direction. The primary FMR peak 370 was produced without an external field and peaks 372, 374, 376, and 378 were produced in magnetic fields of 500 Oe, 600 Oe, 840 Oe, and 1200 Oe, respectively. The FMR peak shifts in external magnetic fields according to:

$$f_0 = \frac{\gamma}{2\pi}\sqrt{M_s H_{stiff}} \quad \text{eq. 3a}$$

$$H_{stiff} = H_k + H_{hb} + H_{ext} \quad \text{eq. 3b}$$

where $\gamma$ is gyromagnetic constant and is equal to $2.21*10^5$ m/As; Ms is the saturation magnetization, which is a property of the free layer material and for recent GMR and TMR heads it is between 700 and 800 emu/cc (7-8*10$^5$ A/m); and $H_{stiff}$ is the effective "stiffness" field of the free layer. As shown in equation 3b, the stiffness field $H_{stiff}$ a combination of anisotropy field Hk, hard bias field Hhb and external field Hext.

With the primary FMR peaks measured for different external longitudinal magnetic fields of different strengths, a critical field can be determined (360). The critical field is the magnitude of the external magnetic field that must be applied in order to create a non-zero external magnetic field within the free layer, which is believed to correspond to the read sensor shield saturation effect. In other words, the critical field is a measure of the offset between a magnitude of an applied longitudinal external magnetic field and a magnitude of the resulting magnetic field within the free layer. One method of determining the critical field is based on extrapolation from the square of the primary FMR peak frequencies with respect to the applied external magnetic fields. FIG. 16 illustrates in graphical form the square of the primary FMR peak frequencies with respect to the applied external magnetic fields using the applied external magnetic fields shown in FIG. 15. As can be seen in FIG. 16A, the dependence is linear except for the first point that corresponds to no external magnetic field, which is the intrinsic stiffness field. By extrapolating the linear dependence, illustrated by line segment 380 in FIG. 16A to the square of the primary FMR peak frequency produced when no external magnetic field is applied, a critical field magnitude of approximately 350 Oe is obtained in this example. The magnitudes of at least one external magnetic field is then corrected using the magnitude of the critical field (362), i.e., the critical field value is subtracted from the applied external magnetic field value, which is illustrated in FIG. 16B. As can be seen in FIG. 16B, the FMR peak frequency dependence becomes linear.

The stiffness field can now be determined based on the measured primary FMR peaks for the zero external magnetic field and a corrected external magnetic field value (364) and the resulting stiffness is recorded (366), e.g., in storage 106s or display 106d of the processor 106. The stiffness field $H_{stiff}$ can be determined based on the following:

$$H_{stiff} = H_{ext}\left(\frac{f_0^2(H_{ext})}{f_0^2(H_{ext}=0)} - 1\right) \qquad \text{eq. 4}$$

where $f_0(H_{ext}=0)$ is the frequency of the FMR peak when no external magnetic field is applied.

Equation 4 produces a stiffness field of approximately 320 Oe from the data in FIG. 16B. The result from equation 4 is determined independently based on absolute values and is based only on the measured ferromagnetic resonance frequencies and known external fields, and therefore provides a read head quality parameter with universal application.

In one embodiment, the offset value representing the difference between a magnitude of an applied external magnetic field and a magnitude of a resulting magnetic field within the free layer can be estimated, e.g., theoretically or empirically from a sample of heads. The estimated offset value can then be used to adjust the magnitude of an applied external magnetic field. In this embodiment, one external magnetic field is used and the stiffness is determined using the stiffness based on the adjusted magnitude of the applied external magnetic field along with the frequency of the FMR peak produced with the applied external magnetic field and the FMR peak produced without an external magnetic field.

Figure 17:
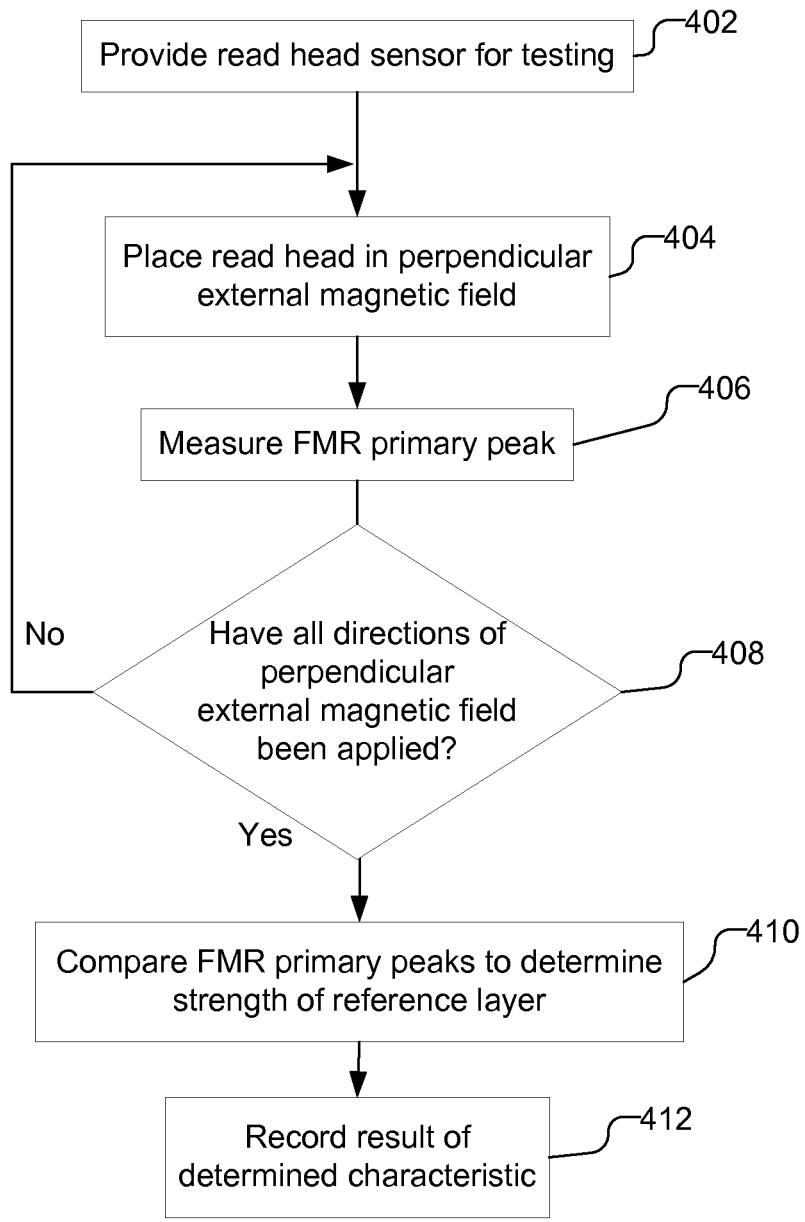
FIG. 17 is a flow chart that illustrates measuring the strength of the reference layer.

In another embodiment, the strength of the reference layer 34 is measured by applying perpendicular external magnetic fields to a read sensor and analyzing the resulting primary FMR peaks in the thermal magnetic fluctuation noise spectra. FIG. 17 is a flow chart that illustrates measuring the strength of the reference layer. As shown in FIG. 17, a read sensor is provided (402) and is placed in a perpendicular external magnetic field, which is parallel with the magnetic field orientation of the reference layer 34 (404). It should be understood that the term "parallel" as used in reference to the applied external magnetic field, need not be perfectly parallel, but should have a component that is sufficiently parallel that the desired effect is achieved without creating other effects that obfuscate the measurement. The thermal magnetic fluctuation noise of the head is measured while in the external magnetic field to determine the primary FMR peak (406). The read sensor is then placed in a perpendicular external magnetic field that is in the opposite direction, i.e., anti-parallel with the magnetic field orientation of the reference layer 34 (408) and the primary FMR peak is again measured. By way of example, external magnetic fields of approximately 400-500 Oe may be used.

Once the primary FMR peak has been measured for both directions of the perpendicular external magnetic field, the primary peaks are compared to each other to determine the strength of the reference layer (410) and the results are recorded, e.g., in storage 106s or display 106d of the processor 106 (412). In one embodiment, a threshold comparison of the primary FMR peaks may be used to determine if the reference layer should be considered weak. In another embodiment, multiple measurements are made each at a different strength of the applied perpendicular external magnetic field. The detected changes in the primary FMR peak frequency and amplitudes can then be used to determine the strength of the reference layer.

Figure 18A:
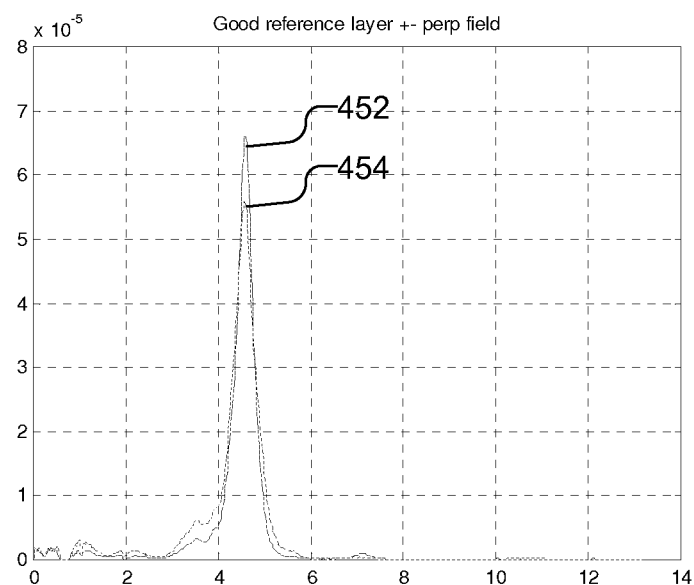
FIGS. 18A and 18B illustrates FMR peaks in the thermal magnetic fluctuation noise spectra for a TMR read heads with a strong reference layer and a weak reference layer, respectively, when perpendicular external magnetic fields are applied.

FIG. 18A, by way of example, illustrates the thermal magnetic fluctuation noise spectra and the primary FMR peaks for a TMR read head with a strong reference layer with perpendicular 500 Oe external magnetic fields applied. The primary peak 452 is produced by a perpendicular field that is parallel to the field in the reference layer and the primary peak 454 is produced by a perpendicular field that is anti-parallel to the field in the reference layer. As can be seen in FIG. 18A, the primary peaks 452 and 454 are relatively close.

Figure 18B:
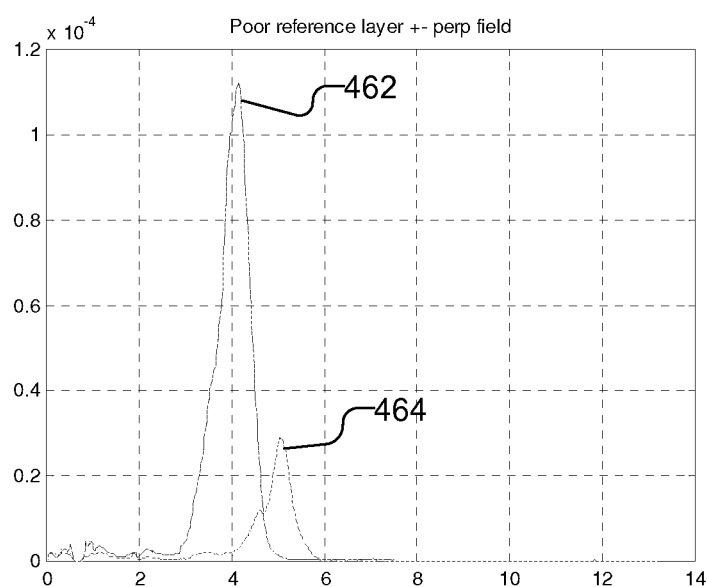

FIG. 18B, on the other hand, illustrates the thermal magnetic fluctuation noise spectra and the primary FMR peaks for a TMR read head with a weak reference layer with perpendicular 500 Oe external magnetic fields applied. The primary peak 462 is produced by a perpendicular field that is parallel to the field in the reference layer and the primary peak 464 is produced by a perpendicular field that is anti-parallel to the field in the reference layer. As can be seen in FIG. 18B, there are large differences in the primary peaks 452 and 454, including a changes in the frequency and the amplitude. This change in the primary peak is due to the parallel external magnetic field having little effect on the orientation of the magnetic field of the reference layer, but the anti-parallel external magnetic field changes the magnetization orientation of the weak reference layer, which in turn alters the ferromagnetic resonance in the free layer.

Although the present invention is illustrated in connection with specific embodiments for instructional purposes, the present invention is not limited thereto. Various adaptations and modifications may be made without departing from the scope of the invention. For example, unless specifically stated or necessary, the acts in the described methods may be varied in order or even combined. Moreover, while some embodiments are described herein with specific reference to a GMR head, it should be understood that the embodiments are not limited thereto but may be used with a TMR head, or vice versa. Therefore, the spirit and scope of the appended claims should not be limited to the foregoing description.

What is claimed is:

1. A method comprising:
    applying a first external magnetic field to a read sensor comprising a free layer having a free layer magnetic orientation in a longitudinal direction that is parallel to an air bearing surface of the read sensor when no external magnetic field is applied and a reference layer having a magnetic orientation that is perpendicular to the longitudinal direction and perpendicular to the air bearing surface of the read sensor, the first external magnetic field having an orientation that is parallel to the magnetic orientation of the reference layer of the read sensor;
    measuring a first thermal magnetic fluctuation noise spectrum from the read sensor when the first external magnetic field is applied to determine a first ferromagnetic resonance peak;
    applying a second external magnetic field to the read sensor, the second external magnetic field having an orientation that is anti-parallel to the magnetic orientation of the reference layer of the read sensor;
    measuring a second thermal magnetic fluctuation noise spectrum from the read sensor when the second external magnetic field is applied to determine a second ferromagnetic resonance peak;
    comparing at least one of respective frequencies and amplitudes of the first ferromagnetic resonance peak and the second ferromagnetic resonance peak to determine a strength value of the reference layer, wherein the strength value is a measure of a relative change in the magnetic orientation of the reference layer caused by the anti-parallel orientation of the second external magnetic field with respect to the parallel orientation of the first external magnetic field;
    storing the strength value of the reference layer.

2. The method of claim 1, wherein the second external magnetic field is applied and the second thermal magnetic fluctuation noise spectrum is measured before applying the first external magnetic field and measuring the first thermal magnetic fluctuation noise spectrum.

3. The method of claim 1, wherein the comparing at least one of the respective frequencies and amplitudes of the first ferromagnetic resonance peak and the second ferromagnetic resonance peak comprises applying a threshold to differences in the at least one of the respective frequencies and amplitudes.

4. The method of claim 1, wherein the first external magnetic field and the second external magnetic field are between 400-5000e.

5. An apparatus comprising:
    a magnetic field generator for applying first and second external magnetic fields to a read sensor that comprises a free layer having a free layer magnetic orientation in a longitudinal direction that is parallel to an air bearing surface of the read sensor when no external magnetic field is applied and a reference layer having a magnetic orientation that is perpendicular to the longitudinal direction and perpendicular to the air bearing surface of the read sensor;
    a high frequency probe to be coupled to the read sensor, wherein high frequency is greater than 1 GHz;
    a high frequency spectrum analyzer coupled to the high frequency probe, the high frequency spectrum analyzer to record thermal magnetic fluctuation noise spectra from the read sensor;
    a processor coupled to the high frequency spectrum analyzer, the processor adapted to receive the thermal magnetic fluctuation noise spectra from the high frequency spectrum analyzer, the processor being further adapted to cause the magnetic field generator to apply the first external magnetic field to the read sensor, the first external magnetic field having an orientation that is parallel to the magnetic orientation of the reference layer of the read sensor, receive a first thermal magnetic fluctuation noise spectrum from the high frequency spectrum analyzer when the first external magnetic field is applied to determine a first ferromagnetic resonance peak, cause the magnetic field generator to apply the second external magnetic field to the read sensor, the second external magnetic field having an orientation that is anti-parallel to the magnetic orientation of the reference layer of the read sensor, receive a second thermal magnetic fluctuation noise spectrum from the high frequency spectrum analyzer when the second external magnetic field is applied to determine a second ferromagnetic resonance peak, compare at least one of respective frequencies and amplitudes of the first ferromagnetic resonance peak and the second ferromagnetic resonance peak to determine a strength value of the reference layer, wherein the strength value is a measure of a relative change in the magnetic orientation of the reference layer caused by the anti-parallel orientation of the second external magnetic field with respect to the parallel orientation of the first external magnetic field, and store the strength value of the reference layer, wherein the thermal magnetic fluctuation noise spectra includes the first and second thermal magnetic fluctuation noise spectrum.

6. The apparatus of claim 5, wherein the second external magnetic field is applied and the second thermal magnetic fluctuation noise spectrum is received before applying the first external magnetic field and measuring the first thermal magnetic fluctuation noise spectrum.

7. The apparatus of claim 5, wherein the processor is adapted to determine the strength value of the reference layer by further applying a threshold to differences in the at least one of the respective frequencies and amplitudes.

8. A method comprising:
    measuring a first thermal magnetic fluctuation noise spectrum from a read sensor, which comprises a free layer having a free layer magnetic orientation in a longitudinal direction that is parallel to an air bearing surface of the read sensor when no external magnetic field is applied and a reference layer having a magnetic orientation that is perpendicular to the longitudinal direction and perpendicular to the air bearing surface of the read sensor, the measuring done when a first external magnetic field having a first magnitude and first orientation is applied to the read sensor;
    measuring a second thermal magnetic fluctuation noise spectrum from the read sensor when a second external magnetic field having a second magnitude and a second orientation is applied to the read sensor; and
    determining a strength value of the reference layer in the read sensor using at least one of respective frequencies and amplitudes of a peak in the first thermal magnetic fluctuation noise spectrum and a peak in the second thermal magnetic fluctuation noise spectrum, wherein the strength value is a measure of a relative change in the magnetic orientation of the reference layer caused by the second orientation of the second external magnetic field with respect to the first orientation of the first external magnetic field; and storing the strength value.

9. The method of claim 8, wherein the peak in the first thermal magnetic fluctuation noise spectrum is a first ferromagnetic resonance peak and the peak in the second thermal magnetic fluctuation noise spectrum is a second ferromagnetic resonance peak, wherein:

the first orientation of the first external magnetic field is parallel to a magnetic orientation of the reference layer of the read sensor;

the second orientation of the second external magnetic field is anti-parallel to the magnetic orientation of the reference layer of the read sensor;

the measuring the first thermal magnetic fluctuation noise spectrum produces the first ferromagnetic resonance peak;

the measuring the second thermal magnetic fluctuation noise spectrum produces the second ferromagnetic resonance peak; and the determining the strength value of the reference layer in the read sensor comprises comparing the at least one of respective frequencies and amplitudes of the first ferromagnetic resonance peak and the second ferromagnetic resonance peak.

10. The method of claim 8, wherein the measuring the second thermal magnetic fluctuation noise spectrum from the read sensor when the second external magnetic field is applied to the read sensor is performed before the measuring the first thermal magnetic fluctuation noise spectrum from the read sensor when the first external magnetic field is applied to the read sensor.

11. The method of claim 9, wherein the comparing at least one of the respective frequencies and amplitudes of the first ferromagnetic resonance peak and the second ferromagnetic resonance peak comprises applying a threshold to differences in the at least one of the respective frequencies and amplitudes.

12. An apparatus comprising:

a magnetic field generator for applying first and second external magnetic fields to a read sensor that comprises a free layer having a free layer magnetic orientation in a longitudinal direction that is parallel to an air bearing surface of the read sensor when no external magnetic field is applied and a reference layer having a magnetic orientation that is perpendicular to the longitudinal direction and perpendicular to the air bearing surface of the read sensor;

a high frequency probe to be coupled to the read sensor, wherein high frequency is greater than 1 GHz;

a high frequency spectrum analyzer coupled to the high frequency probe, the high frequency spectrum analyzer to record thermal magnetic fluctuation noise spectra from the read sensor;

a processor coupled to the high frequency spectrum analyzer, the processor adapted to receive the thermal magnetic fluctuation noise spectra from the high frequency spectrum analyzer and to cause the magnetic field generator to apply the first and second external magnetic fields to the read sensor, the processor being further adapted to receive a first thermal magnetic fluctuation noise spectrum from the high frequency spectrum analyzer when the first external magnetic field having a first magnitude and first orientation is applied to the read sensor, receive a second thermal magnetic fluctuation noise spectrum from the high frequency spectrum analyzer when the second external magnetic field having a second magnitude and a second orientation is applied to the read sensor, determine a strength value of the reference layer in the read sensor using at least one of respective frequencies and amplitudes of a peak in the first thermal magnetic fluctuation noise spectrum and a peak in the second thermal magnetic fluctuation noise spectrum, wherein the strength value is a measure of a relative change in the magnetic orientation of the reference layer caused by the second orientation of the second external magnetic field with respect to the first orientation of the first external magnetic field, and to store the strength value, wherein the thermal magnetic fluctuation noise spectra includes the first and second thermal magnetic fluctuation noise spectrum.

13. The apparatus of claim 12, wherein the peak in the first thermal magnetic fluctuation noise spectrum is a first ferromagnetic resonance peak and the peak in the second thermal magnetic fluctuation noise spectrum is a second ferromagnetic resonance peak, wherein:

the first orientation of the first external magnetic field is parallel to a magnetic orientation of the reference layer of the read sensor;

the second orientation of the second external magnetic field is anti-parallel to the magnetic orientation of the reference layer of the read sensor;

the processor is adapted to determine the first ferromagnetic resonance peak from the first thermal magnetic fluctuation noise spectrum;

the processor is adapted to determine the second ferromagnetic resonance peak from the second thermal magnetic fluctuation noise spectrum; and the processor is adapted to determine the strength value of the reference layer in the read sensor by being further adapted to compare the at least one of respective frequencies and amplitudes of the first ferromagnetic resonance peak and the second ferromagnetic resonance peak.

14. The apparatus of claim 12, wherein the processor is adapted to measure the second thermal magnetic fluctuation noise spectrum before the first thermal magnetic fluctuation noise spectrum is measured.

15. The apparatus of claim 13, wherein the processor is adapted to determine the strength value of the reference layer in the read sensor by being further adapted to apply a threshold to differences in the at least one of the respective frequencies and amplitudes.

* * * * *